Nov. 6, 1923.  
E. F. PAWSAT  
1,472,812  
DEVICE FOR REPAIRING PNEUMATIC TIRES  
Filed July 9, 1920
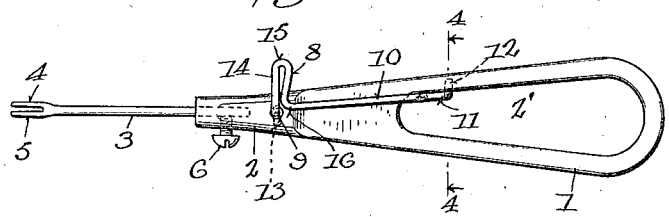
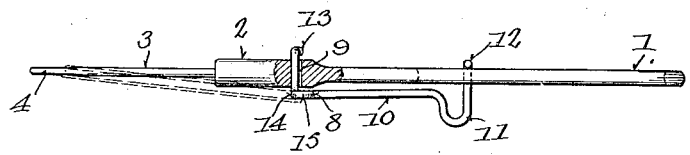
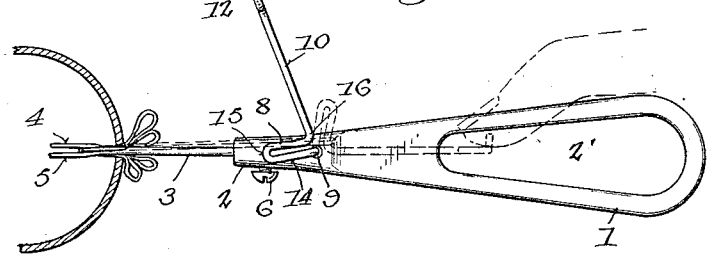
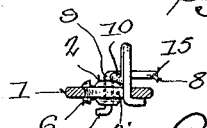
Ewald F. Pawsat INVENTOR.
BY Erwin Wheeler & Woolard ATTORNEYS.

Patented Nov. 6, 1923.

1,472,812

UNITED STATES PATENT OFFICE.

EWALD F. PAWSAT, OF SHEBOYGAN, WISCONSIN.

DEVICE FOR REPAIRING PNEUMATIC TIRES.

Application filed July 9, 1920. Serial No. 394,912.

*To all whom it may concern:*

Be it known that I, EWALD F. PAWSAT, a citizen of the United States, residing at Sheboygan, county of Sheboygan, and State of Wisconsin, have invented new and useful Improvements in Devices for Repairing Pneumatic Tires, of which the following is a specification.

My invention relates to improvements in devices for repairing pneumatic tires by filling punctures therein with rubber bands inserted under tension, and then released and allowed to become cemented to the walls of the puncture or aperture in the tire, the latter having previously been covered with rubber cement. Devices of this type are known in the art as rubber band shooters.

More particularly, my invention relates to improvements of the general type described in Letters Patent of the United States, #789,931, dated May 16th, 1905, of which patent I am the owner.

The object of the present invention is to provide means for holding rubber bands under tension pending the insertion of the tool in the tire puncture, and then releasing the bands in such a manner that each and every band, or each and every loop of a single band, will be simultaneously disengaged from the retaining device, whereby all portions of the band or bands contained within the puncture may instantly expand in cross section, and seat upon the walls of the puncture and the other strands of the band without any further relative movement. I have discovered that where the several strands of the band or bands are released successively, the drawing effect of the bands upon each other tends to remove the cement, and the expansion of some of the strands tends to prevent the other strands from expanding within the aperture in such a manner as to completely close the opening. Therefore, many failures result in the repair of tires by this method of seating rubber bands in the puncture, and such failures have been largely due to the fact that the tools heretofore in use do not provide that instant release or simultaneous release of all the bands, which is essential to the best results.

The tool disclosed in said former Patent No. 789,931, while approximating the desired instant release, was nevertheless sluggish in its action as compared with the invention herein disclosed, this being partly due to the fact that the bands were engaged in a hook, and it was necessary for the bands to travel along the bend of the hook to the point thereof after the hook had swung to a position where the tension of the strands would cause the band to slip. The retaining hook was formed of stamped sheet metal, and the edges thereof required finishing in order to obviate any tendency to cut the bands while slipping along the bend of the hook, it being necessary to avoid such cutting in order to secure even an approximate simultaneous release of the strands.

More particularly, therefore, it is the object of my present invention to provide a band retainer of such type that the hook may be eliminated, and the strands engaged about a member which is circular in cross section, or which has rounded surfaces over which the strands may slide freely; to provide means for initially supporting said member substantially at right angles to the line of tension; and to further provide a retaining member which, when manually released, will swing with perfect freedom, and without material inertia to be overcome by the band, thus releasing the band with greater freedom and certainty of simultaneous release than in any of the devices heretofore constructed.

In the drawings:—

Figure 1 is a view of my improved rubber band shooter as seen from the side on which the band retaining arm is located.

Figure 2 is a view, taken at right angles to that of Figure 1, showing the retaining arm on the lower side, and indicating the relation of the lever anchor to the handle; a rubber band being illustrated in dotted lines as it appears when under tension.

Figure 3 is a view similar to Figure 1, illustrating the retainer in position of release, and showing the released band in its relation to the puncture as it appears preparatory to the withdrawal of the tool.

Figure 4 is a cross sectional view, drawn on line 4—4 of Figure 1.

Like parts are identified by the same reference characters thruout the several views.

The handle 1 of my improved tool may be formed of any suitable material, such as stamped or cast metal. The shank portion 2 is provided with a socket adapted to receive the shank of a forked needle 3, the outer extremity of which has two fork arms 4 and 5, between which the rubber band may be engaged. 6 is a set screw for holding the needle in position.

A band retaining arm 8 is pivoted to the shank 2 at 9, and also connected with a lever 10, having an operating piece 11 and an elbowed anchor 12, adapted for engagement with one side margin of the handle aperture 2' when the arm 8 is in a laterally projecting position. The parts 9 to 12 inclusive, are preferably formed of a single piece of wire, one end portion of which forms the pivot pin 9. The extremity of this portion is elbowed or headed at 13 to secure the pivot pin 9 in position, and at the other side of the shank 2 the wire is again elbowed to form a laterally projecting arm 14 which is looped at 15, and folded backwardly upon itself to form the arm 8. The wire is then elbowed in a plane parallel with the handle 1 at 16 to form the lever 10. It is looped outwardly from the plane of the handle to form the operating piece 11, and its end portion constitutes the anchor arm 12, which, as above stated, is again elbowed near the extremity. This last mentioned elbow allows the anchor portion 12 to engage the opposite side of the handle from that occupied by the operating piece 11 when the rubber band is being adjusted to the tool preparatory to a repair operation.

In the use of the tool, the handle 10 is first swung to the position in which it is shown in Figure 1, and the anchor 12 is passed thru the handle aperture 2' with the elbowed extremity engaging the handle at one side of said aperture. An intermediate portion of a rubber band is then passed between the fork arms 4 and 5, and the several strands of the band are then drawn to the required tension, and the looped ends engaged over the arm 8. Thereupon, the forked needle 3 is pushed thru the puncture or aperture in the tire, which has previously been cleaned and prepared with rubber cement. As soon as the needle portion of the tool has been inserted in the tire, the operator presses with the thumb or finger upon the operating piece 11 to swing the handle 10 partially across the aperture 2 until the anchor 12 is released from the handle and permitted to pass thru the aperture, after which the operating piece is released and the tension of the band is then exerted upon the arm 8 to cause an instantaneous swinging movement of the arm and handle 10 to substantially the position in which it is shown in Figure 3. The aperture in the shank 2 thru which the pivot pin 9 passes, is sufficiently large to not only permit a perfectly free swinging movement, but it is also large enough to allow the lever 10 to swing freely in a plane at right angles to that of the handle 1 for the limited distance required to engage and disengage the anchor 12 from the handle.

By forming the band retaining member of my improved tool from a single piece of wire which includes the pivot pin, the band engaging arm, the lever and the anchor, the tool can be produced at less expense than that disclosed in said former patent, and greater facility of manipulation and certainty in making a good repair is attained. The large aperture 2 in the handle makes it possible to pass the lever anchor 12 thru it without loss of time, and this free passage of the anchor also facilitates its release by a very simple and natural pressure of one finger or thumb of the same hand in which the handle is held during the manipulation of the tool.

It will, of course, be understood that if desired the anchor may be engaged with the outer margin of the handle, but I prefer to insert the anchor thru the aperture 2' for the reason that by so doing the arm 8 will be held in position to receive the band, pending the manipulation of the latter between the arms and the fork.

It will be observed that the curve of the outer portion of the arm 8, which is produced by looping the wire at 15 to form this arm, is so disposed that the arm converges inwardly toward the pivot and toward its junction with the lever 10 at the elbow 16. This facilitates a simultaneous discharge of all the strands in the band by the tendency of the strands to collect or bunch together near the elbow 16, and to prevent any one of the strands from starting to slip off before the lever has acquired a rapid movement following the release of the anchor.

After the bands have been released simultaneously as above described, the outer loops of the several strands assume the position in which they are shown in Figure 3, the release having been simultaneous with a consequent simultaneous expansion of the bands within the puncture. There will be no tendency to relax the tension of the strands at their inner ends where they are looped thru the fork of the needle. Therefore, when the tool is withdrawn, the tension of these portions of the rubber strands will also be simultaneously relieved, and the thickening portions within the tire will completely close the opening which the needle would otherwise tend to leave when withdrawn. This is another advantage to be attained by an instantaneous release of the outer portions of the respective strands, which if separately released would draw thru the puncture and relax the tension on the inner side before the withdrawal of the tool. In such cases, when the tool is withdrawn the inwardly projecting portions of the strands will not expand in cross section sufficiently to close the opening.

I claim:—

1. A repair tool for pneumatic tires comprising the combination with a forked needle for insertion in a tire puncture, of an apertured handle, a lever pivoted to the handle and provided with an anchoring projection adapted to freely engage in said aperture, and an arm upon the lever projecting laterally at one side of said handle, whereby strands of a rubber band may be held under tension by looping them thru the fork of said needle and about said laterally projecting arm, and whereby all of the strands of said band may be simultaneously released by a withdrawal of the anchor from engagement with the handle.

2. A repair tool for pneumatic tires comprising the combination with a forked needle, a handle, a lever pivoted to the handle and provided with a laterally projecting arm adjacent to its pivotal connection with the handle, and a handle engaging anchor connected with the lever.

3. A repair tool for shooting rubber bands into pneumatic tires, comprising the combination with a handle of a band inserting member and a piece of wire provided with a pivot in the handle and bent outwardly across the surface of the handle to form a flattened loop adapted to be engaged by said bands beyond the edge of the handle, and extended thence longitudinally of the handle and provided with a handle engaging hook at its end.

In testimony whereof I affix my signature in the presence of two witnesses.

EWALD F. PAWSAT.

Witnesses:
M. SCHUBERT,
A. PAASCH.